United States Patent
Walters et al.

(10) Patent No.: US 9,659,014 B1
(45) Date of Patent: May 23, 2017

(54) AUDIO AND VIDEO MATCHING USING A HYBRID OF FINGERPRINTING AND CONTENT BASED CLASSIFICATION

(71) Applicant: Google Inc., Mountain View, CA (US)

(72) Inventors: Thomas Chadwick Walters, Bromley (GB); Gertjan Pieter Halkes, Adliswil (CH); Matthias Rochus Konrad, Zürich (CH); Gheorghe Postelnicu, Zürich (CH)

(73) Assignee: Google Inc., Mountain View, CA (US)

( * ) Notice: Subject to any disclaimer, the term of this patent is extended or adjusted under 35 U.S.C. 154(b) by 414 days.

(21) Appl. No.: 14/024,150

(22) Filed: Sep. 11, 2013

Related U.S. Application Data

(60) Provisional application No. 61/818,206, filed on May 1, 2013.

(51) Int. Cl.
*G06F 17/30* (2006.01)

(52) U.S. Cl.
CPC .. *G06F 17/30023* (2013.01); *G06F 17/30598* (2013.01); *G06F 17/30026* (2013.01); *G06F 17/30032* (2013.01); *G06F 17/3074* (2013.01); *G06F 17/30454* (2013.01); *G06F 17/30743* (2013.01)

(58) Field of Classification Search
CPC ..... H04L 41/12; H04L 43/10; H04L 41/0813; H04L 41/0823; H04L 41/0869; G06F 17/30598; G06F 17/30026; G06F 17/30032; G06F 17/3074; G06F 17/30743

USPC ..... 707/748, 752, 749, 737, 769; 348/14.08; 386/241, 250; 375/40.16; 713/176; 700/94; 382/103; 705/35

See application file for complete search history.

(56) References Cited

U.S. PATENT DOCUMENTS

| | | | | |
|---|---|---|---|---|
| 6,339,770 | B1 * | 1/2002 | Leung | G06F 17/30454 |
| 7,085,613 | B2 * | 8/2006 | Pitman et al. | 700/94 |
| 7,260,308 | B2 * | 8/2007 | Engle et al. | 386/250 |
| 7,693,806 | B2 * | 4/2010 | Yih | G06K 9/6256 |
| | | | | 706/25 |

(Continued)

FOREIGN PATENT DOCUMENTS

WO    WO 2010117581 A1 * 10/2010 ............. G06F 17/30

OTHER PUBLICATIONS

Baluja, S., et al., "Waveprint: Efficient wavelet-based audio fingerprinting," Pattern Recognition, 2008, pp. 3467-3480, vol. 41, Elsevier Ltd.

(Continued)

*Primary Examiner* — Frantz Coby
(74) *Attorney, Agent, or Firm* — Byrne Poh LLP

(57) ABSTRACT

Aspects relate to determining whether a probe media content matches one or more reference media content. The reference media content is classified into a content class. The probe media content could also be classified into a content class. Similarities between the probe media content and the reference media content are identified. A matching score given to the probe media content is weighted based on statistics regarding matches and false-positive rates for the content class of the reference media content. Further, classifiers can be trained on computed audio features and video features and/or video metadata and audio metadata of various media content.

19 Claims, 9 Drawing Sheets

(56) References Cited

U.S. PATENT DOCUMENTS

| | | | | |
|---|---|---|---|---|
| 7,792,746 B2* | 9/2010 | Del Callar | | G06Q 20/10 |
| | | | | 705/35 |
| 7,941,437 B2* | 5/2011 | Cooley | | H04L 51/12 |
| | | | | 707/754 |
| 8,212,135 B1* | 7/2012 | Sharifi | | G10H 1/00 |
| | | | | 84/609 |
| 8,265,333 B2* | 9/2012 | Lahr | | G06F 17/30799 |
| | | | | 382/100 |
| 8,266,142 B2* | 9/2012 | Jiang | | G06F 17/30743 |
| | | | | 707/725 |
| 8,311,969 B2* | 11/2012 | Jeremiah | | G06K 9/6217 |
| | | | | 706/50 |
| 8,341,412 B2* | 12/2012 | Conwell | | 713/176 |
| 8,458,482 B2* | 6/2013 | Conwell | | 713/176 |
| 8,611,422 B1* | 12/2013 | Yagnik et al. | | 375/240.16 |
| 8,635,171 B1* | 1/2014 | Kennedy | | G06K 9/6256 |
| | | | | 706/12 |
| 8,682,298 B2* | 3/2014 | Roundtree | | H04M 1/72552 |
| | | | | 455/414.1 |
| 8,688,999 B2* | 4/2014 | Conwell | | 713/176 |
| 8,699,852 B2* | 4/2014 | Jiang et al. | | 386/241 |
| 8,737,681 B2* | 5/2014 | Lahr | | G06F 17/30799 |
| | | | | 382/100 |
| 8,842,920 B1* | 9/2014 | Ioffe | | G06K 9/00744 |
| | | | | 382/100 |
| 8,868,917 B2* | 10/2014 | Conwell | | G06Q 10/00 |
| | | | | 707/758 |
| 8,873,799 B2* | 10/2014 | Oami | | G06F 17/30256 |
| | | | | 382/103 |
| 9,070,187 B2* | 6/2015 | Lahr | | G06F 17/30799 |
| 9,098,576 B1* | 8/2015 | Sharifi | | G06F 17/3074 |
| 9,116,928 B1* | 8/2015 | Maennel | | G06F 17/30247 |
| 9,268,845 B1* | 2/2016 | Sharifi | | G06F 17/30743 |
| 9,330,426 B2* | 5/2016 | Davis | | G06T 1/0021 |
| 9,449,232 B2* | 9/2016 | Lahr | | G06F 17/30799 |
| 2009/0055412 A1* | 2/2009 | Cooley | | H04L 51/12 |
| 2009/0089326 A1* | 4/2009 | Balasubramanian | | G06F 17/3089 |
| 2009/0290764 A1* | 11/2009 | Fiebrink | | G06F 17/30743 |
| | | | | 382/124 |
| 2010/0161654 A1* | 6/2010 | Levy | | G06F 17/30032 |
| | | | | 707/769 |
| 2013/0208942 A1* | 8/2013 | Davis | | G06F 21/10 |
| | | | | 382/100 |
| 2014/0002749 A1* | 1/2014 | Pora | | H04N 21/4394 |
| | | | | 348/725 |
| 2014/0152760 A1* | 6/2014 | Granstrom et al. | | 348/14.08 |
| 2014/0274396 A1* | 9/2014 | Mikhailov | | A63F 13/422 |
| | | | | 463/37 |
| 2016/0267180 A1* | 9/2016 | Harron | | G06F 17/30047 |

OTHER PUBLICATIONS

Walters, T., et al., "The Intervalgram: An Audio Feature for Large-scale Melody Recognition," 9th International Symposium on Computer Music Modelling and Retrieval (CMMR 2012), Jun. 19-22, 2012, pp. 295-310, Queen Mary University of London.

Chandrasekhar, V., et al., "Automatic Language Identification in Music Videos with Low Level Audio and Visual Features," Proceedings of the IEEE Conference on Acoustics, Speech, and Signal Processing (ICASSP), 2011, 4 pages.

* cited by examiner

AUDIO AND VIDEO MATCHING USING A HYBRID OF FINGERPRINTING AND CONTENT BASED CLASSIFICATION

CROSS REFERENCE TO RELATED APPLICATIONS

The subject patent application claims the benefit under 35 U.S.C. §119(e) of U.S. Provisional Application Ser. No. 61/818,206, filed May 1, 2013, entitled "AUDIO AND VIDEO MATCHING USING A HYBRID OF FINGER-PRINTING AND CONTENT BASED CLASSIFICATION", which is hereby incorporated by reference in its entirety.

TECHNICAL FIELD

This disclosure generally relates to audio and video matching using a hybrid of fingerprinting and content based classification.

BACKGROUND

Media sharing mediums (e.g., media sharing websites) allow users to create, upload, view, and share videos. At times, these videos include original content of a user that created and uploaded the video. However, there might be times when a user creates and uploads videos that are comprised entirely, or partially, of copyrighted media content of one or more other authors. Owners of such copyrighted media content may desire to identify videos that include copyrighted media content that has not been authorized for such use and oppose the unauthorized use by blocking publication of the video(s). In some instances, owners of the copyrighted media content may allow certain user videos that include their copyrighted media to be published without objection, usually in exchange for some type of reward and/or benefit to the owner of the copyrighted media content. As the number of user videos employing copyrighted media content of an original item increase, owners of the copyrighted media content may have a difficult time identifying the original media amongst a large collection of copies through use of a standard search engine.

BRIEF DESCRIPTION OF THE DRAWINGS

Various non-limiting implementations are further described with reference to the accompanying drawings in which.

DETAILED DESCRIPTION

Various embodiments or features of the subject disclosure are described with reference to the drawings. In the following description, for purposes of explanation, numerous specific details are set forth in order to provide a thorough understanding of the subject disclosure. It may be evident, however, that the disclosed subject matter can be practiced without these specific details. In other instances, well-known structures and components are shown in block diagram form in order to facilitate describing the subject disclosure.

By way of introduction, the subject matter disclosed herein relates to classifying and weighting videos based on video features and audio features of the videos. Raw audio and video fingerprint information is fused with rich content-based classification in order to improve matching quality in specific genres of videos (sometimes referred to as "vertical" or "verticals").

In an example, the addition of vertical-specific classifiers can be utilized to detect that a particular audio reference (e.g., from the copyrighted media content) is classical music. There is a strong possibility that when there is a live performance of classical music, that live performance might sound very similar to another video of that classical music. Therefore, the score given to specific matching regions can be down weighted based on prior knowledge about the statistics of classical music matches and false-positive rate for this vertical. The rich content signals could also be built into the matching system at a lower level. For example, if a reference file is determined by the classifier as being likely to be techno music, the matching can be made more sensitive to avoid repetitive beats from one techno track being mistaken for repetitive beats from another similar track. As another example, if a probe video is determined to be likely to be of a particular sport, where the interest is in catching very short clips (as compared to the overall length of the probe video), more resources can be expended at the earlier stages of matching (as compared to the resources expended matching other content). Such distribution of resources increases the probability that possible references related to the sport, which might match the video, are searched more exhaustively.

Figure 1:
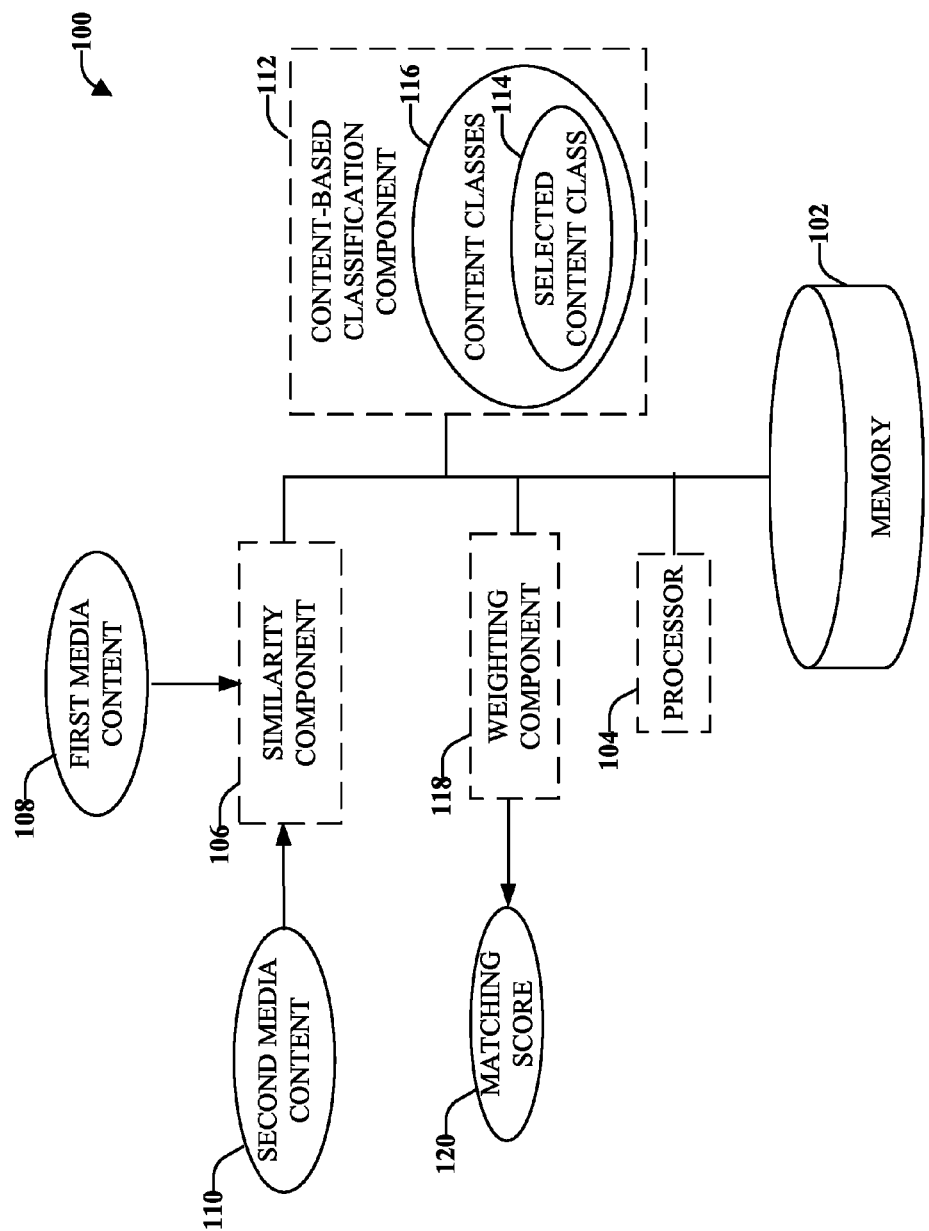
FIG. 1 illustrates an example non-limiting system for audio and video matching using fingerprinting and content-based classification, according to an aspect.

Referring initially to FIG. 1, illustrated is an example non-limiting system 100 for audio and video matching using fingerprinting and content-based classification, according to an aspect. System 100 can improve a decision about whether two pieces of media content (e.g., a reference media content and a probe media content) constitute a match for each other based on information about the specific type of content being matched. For example, system 100 can utilize a genre of the video media content and/or the audio media content being matched in order to add more intelligence about the specific form of media content while matching decisions are being made.

For example, if the genre is classical music, there might be a tendency to derive more false-positives that indicate two (or more) media content are similar than would be derived from another genre of music. That is, where live performances of a classical piece of music, for example, result in a strong, but incorrect match for one or more reference recordings of that piece. This can occur partly because there are many different references for the same piece of classical music, and partly because many live performers of classical music produce performances that sound similar to known recordings (e.g., recordings of copyrighted media content).

As another example, for sporting events, it might be more beneficial to catch very short snippets of the play (for example a goal). In this case, the system 100 can make matching more exhaustive when the content is identified as being likely to be a sporting event. In this manner, more resources can be expended in the earlier stages of the matching (as compared to matching other content) so that possible references related to the sport, which might match the video, are searched more exhaustively.

Various embodiments of the systems, apparatuses, and/or processes explained in this disclosure can constitute machine-executable components embodied within one or more machines, such as, for example, embodied in one or more computer readable mediums (or media) associated with one or more machines. Such component(s), when executed by the one or more machines (e.g., computer(s), computing device(s), virtual machine(s), and so on) can cause the machine(s) to perform the operations described.

In an example, a tangible computer-readable storage medium can comprise computer-readable instructions that, in response to execution, cause a computing system to perform operations. The operations can include analyzing similarities between a first media content and a second media content and classifying at least the first media content into a content class selected from a plurality of content classes. The operations can also include weighting a matching score given to the second media content based on statistics regarding matches and false positive rates for the content type of the first media content.

According to an implementation, the operations can include training classifiers based on a set of audio features and a set of video features derived from a plurality of media content, which can include the first media content. Further to this implementation, the operations can include performing classification on the set of audio features and the set of video features of the first media content and/or the second media content, such as by running the trained classifiers.

In an example, the first media content can include repetitive content. Further to this example, the operations can include increasing sensitivity of the evaluating in order to avoid repetitive beats from a track of the first media content being mistaken for repetitive beats from another track.

In another example, the first media content comprises a sports video and operations can comprise expending more resources at earlier stages of the matching (as compared to matching other content) and searching references related to a sport that matches the second media content more exhaustively.

In yet another example, the first media content comprises classical music. Further to this example, the operations can comprise down weighting the matching score based on false-positive rates associated with the content type.

With continuing reference to FIG. 1, the system 100 can include at least one memory 102 that stores computer executable components and instructions. The system 100 can also include at least one processor 104 that executes the computer executable components stored in the at least one memory 102. It should be noted that although one or more computer executable components may be described herein and illustrated as components separate from the at least one memory 102, in accordance with various embodiments, the one or more computer executable components could be stored in the at least one memory 102.

In an embodiment, system 100 includes a similarity component 106 that analyzes similarities between a first media content 108 and a second media content 110. For example, the first media content can be a copyrighted media content and used as a reference media content that is obtained from an owner of the copyrighted media content. The owner of the first media content might be interested in identifying videos that include unauthorized use of his copyrighted media content and prevent the unauthorized use by blocking publication of the video(s). In some instances, owners of the copyrighted media content may allow certain user videos that include their copyrighted media to be published without objection, usually in exchange for some type of reward and/or benefit to the owner of the copyrighted media content. The reference content can be maintained in the memory 102 or in another storage media, which can be internal to system 100 and/or external to, and selectively accessible by, system 100.

The second media content 110 can be the media content that is to be compared to the first media content 108 (as well as other media content). For example, the second media content 110 (e.g., probe media content) can be a video that is being uploaded, or has been uploaded, to a media sharing medium (e.g., one or more media sharing websites).

To initiate the matching process, according to an aspect, the second media content 110 can be flagged as potentially containing copyrighted material. For example, someone that has viewed the video and believes that it might contain copyrighted material that has been used without permission can flag or provide feedback about the video content.

In another example, the second media content 110 can be dynamically reviewed at about the same time as the content is uploaded to the media sharing medium or at a different time. In an example, a person that uploads the second media content 110 might request review and approval to publish the content. In another example, all or a subset of the uploaded videos can be dynamically reviewed on an automatic basis.

However, various other triggers can be utilized to initiate the matching process. For example, system 100 can selectively review various media content dynamically based on an amount of times the video has been viewed and/or the videos that a user is likely to view after viewing the second media content (or that the user viewed before viewing the second media content).

A content-based classification component 112 can classify the first media content 108 into at least one content class 114 selected from a plurality of content classes 116. The classification can be performed by the content-based classification component 112 at about the same time as the first media content 108 is indicated as containing copyrighted material. For example, at about the same time as an owner of the first media content 108 indicates the desire to identify other media content that contains one or more portions of the first media content 108, the content-based classification component 112 can classify the first media content 108 into the content class. However, the classification by the content-based classification component 112 can be performed at a different time (e.g., when the second media content 110 is identified for comparison with the first media content 108 and/or other copyrighted media content).

In one example, to perform the classification, the content-based classification component 112 can obtain information from the owner of the first media content 108. For example, the owner can provide information related to the type of content and/or other information that can be utilized to match the first media content 108 with other content (e.g., the second media content 110 and/or subsequent media contents). The type of content and/or other information can include a category of the content, a genre of the content, a description of the content, and so on. The information can be provided by the owner of the first media content 108 at about the same time as the first media content 108 is uploaded, at about the same time as the owner (or another authorized person) indicates that the first media content 108 is to be compared to other media content, or at a different time.

In another example, the type of content can be dynamically determined based on evaluation and identification of various portions of the content. For example, various information can include a copy of the reference or data that identifies (e.g., audio fingerprint, digital fingerprint, title information, author information, and so forth) the reference media content.

In some implementations, the first media content 108 might comprise more than one type of content or more than one genre of content. For example, if the first media content 108 includes musical performances for persons demonstrating their musical talents (e.g., during an audition or casting call), there might be a wide range of music genres captured during the auditions. Thus, content-based classification component 112 might assign different content classes to different portions or segments of captured auditions.

According to an implementation, the content-based classification component 112 can add side-channel information and assist with matching based on the content class of the first media content 108, the second media content 110, or both the first media content 108 and the second media content 110. The side-channel information can include, for example, a classifier score, a metadata score, a weighted score, and/or other information that can be used to compare two or more media content.

According to some implementations, the side-channel information can be derived from running trained machine learning based classifiers on audio features and/or video features derived from a reference content database, which can comprise reference media content (including the first media content 108) that is to be matched. In accordance with some implementations, the audio features can be low-level audio features and/or the video features can be low-level video features. In an example, the audio features can include extracting features that can be useful for discriminating between genres. In another example, the video features can include one or more of color, visual effects, and so on. According to some implementations, the side-channel information can be derived based on extending an evaluation to include other features, such as video metadata and/or audio metadata, for example.

In accordance with another implementation, the content-based classification component 112 can enhance precision of matching in specific genres of audio, video, or both audio and video included in the first media content 108 and/or the second media content 110. For example, classifier scores can be used to modify how the final matching is performed and/or to apply weightings assigned for the final matching.

A weighting component 118 weights a matching score 120 given to the second media content 110 based on statistics regarding matches and false-positive rates for the content class of the first media content 108. For example, the weighting component 118 can weight the matching score 120 given to the second media content 110 based on knowledge of statistics of matches and a false-positive rates for specific genres of video included in the first media content 108 and the second media content 110. The weighting can be performed over the entire content of the second media content 110 and/or over one or more portions (e.g., less than the entire content) of the second media content 110. In some implementations, different weightings and/or different matching scores can be applied to different segments of the second media content 110.

According to an implementation, the weighting component 118 can down weight the matching score 120 based on false-positive rates associated with the content type. Further to this implementation, the first media content can comprise classical music and, based on the number of false-positive matches identified for classical music, the confidence that the second media content is likely to match the first media content might be lower than expected. Therefore, the matching score 120 can be down weighted by the weighting component 118 in order to compensate for the low confidence level associated with matches in the classical music genre.

In accordance with another implementation, the weighting component 118 can up weight the matching score 120 based on an accuracy associated with the content type. For example, if there is high probability of accuracy, the matching score can be up weighted due to high confidence level associated with the content type. In an example, if the content type and/or genre associated with the first content media is associated with a strong or high confidence that matches are accurate, the matching score 120 can be assigned a higher weight by the weighting component 118, which can indicate the higher confidence level.

According to some aspects, the second media content 110 might match more than one reference video (e.g., the first media content 108 and one or more other copyrighted media content). For example, the second media content 110 might have video content that matches at least one copyrighted media content and, further, the second media content 110 includes audio content that matches at least one other copyrighted media content. In another example, the second media content 110 might have a portion that matches the first media content 108 and another portion that matches at least one other copyrighted media content. The disclosed aspects can be configured to perform matching between the second media content 110 and one or more reference media contents (e.g., the first media content 108 and at least one other media content) and weights of the various matches can be assigned individually and/or collectively for each matched region or portion of the second media content 110.

Figure 2:
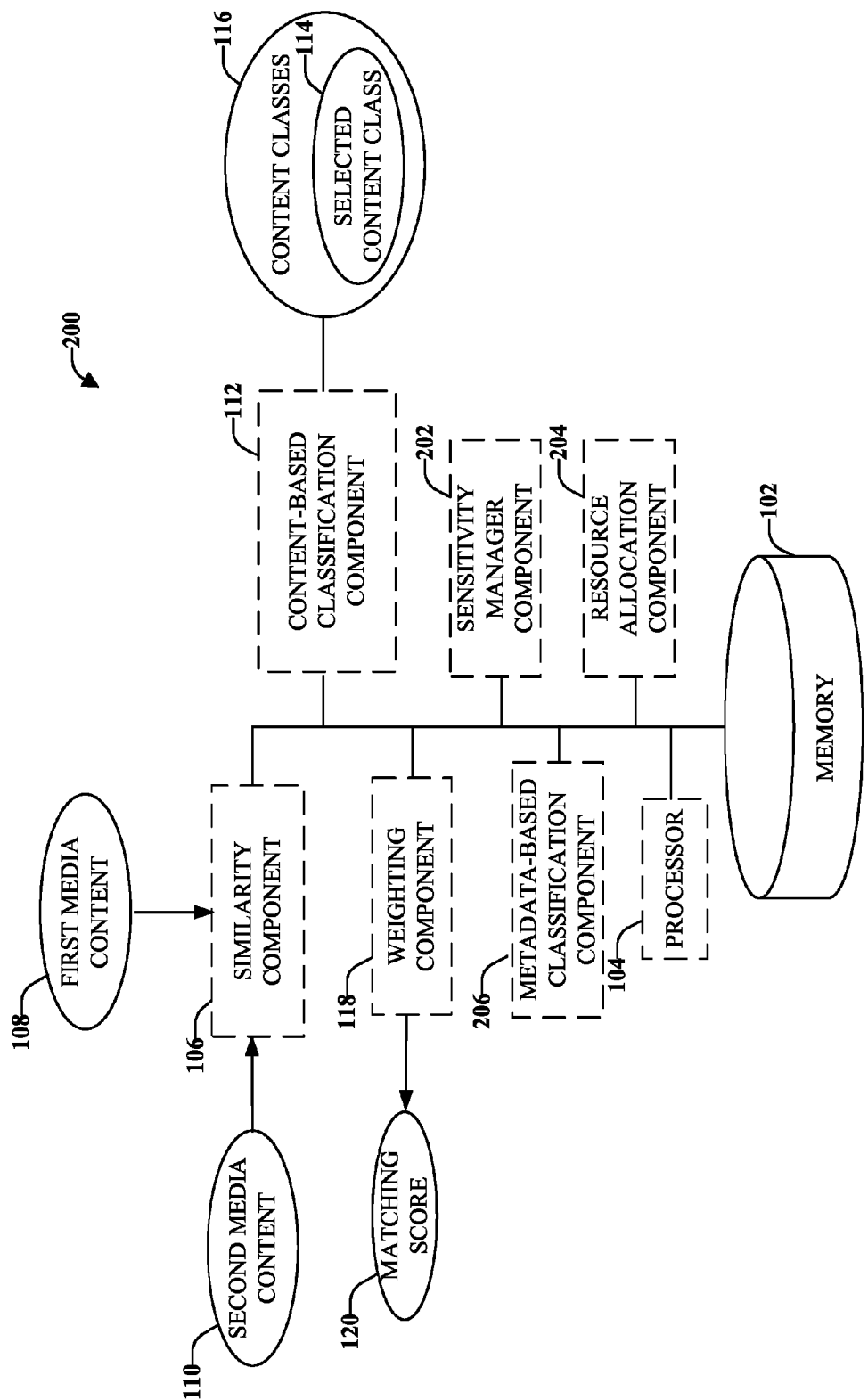
FIG. 2 illustrates an example, non-limiting system for implementing audio and video matching, according to an aspect.

FIG. 2 illustrates an example, non-limiting system 200 for implementing audio and video matching, according to an aspect. Based on the content type, various parameters can be dynamically adjusted to increase effectiveness of the matching process. Such parameters include, but are not limited to, sensitivity of the classification and/or a resource management during the classification.

According to an implementation, a sensitivity manager component 202 can adjust sensitivity associated with classification performed by the content-based classification component 112. For example, if the first media content 108 comprises repetitive content, the sensitivity manager component 202 can increase sensitivity of the classification. Increased sensitivity can assist to avoid a first set of repetitive content of the first media content 108 being mistaken for a second set of repetitive content of the first media content 108 and/or the second media content 110. An example of media content that includes repetitive content can be, for example, techno music.

In another example, if the first media content 108 comprises portions that can be distinguished from other portions, the sensitivity manager component 202 can decrease sensitivity of classification. The decrease in sensitivity can be due to the various portions of the first media content 108 not being expected to be mistaken for other portions of the first media content 108. An example of media content that includes distinctive portions can be, for example, a college lecture, a poetry reading, and so forth.

According to another implementation, a resource allocation component 204 can adjust location where, during classification, resources are expended. In this manner, resources can be conserved during a first location or segment and the conserved resources applied at a different location or segment. For example, the first media content comprises short segments of interest relative to the length of the first media content that comprises other segments (e.g., long segments) that are not of interest. Further to this example, the resource allocation component 204 can cause more resources to be expended at earlier stages of the classification (compared to matching other content in other stages of the matching) and references related to the short segments of interest that match the second media content can be searched more exhaustively than they would normally be searched. An example of media content that includes short segments of interest can include, for example, a sports video, such as a soccer game, a football game, a hockey match, a swimming competition, and so on.

In accordance with an aspect, system 200 can include a metadata-based classification component 206 that can classify the media content (e.g., first media content 108, second media content 110, and subsequent media content) based at least in part on metadata of the first media content 108 and/or the second media content 110. For example, the metadata-based classification component 206 can classify each of the media content into one of a number of classes. The decision related to the selection of the class into which the respective media content falls into can be used to determine, at least in part, if a particular media content matches another media content as discussed herein.

Figure 3:
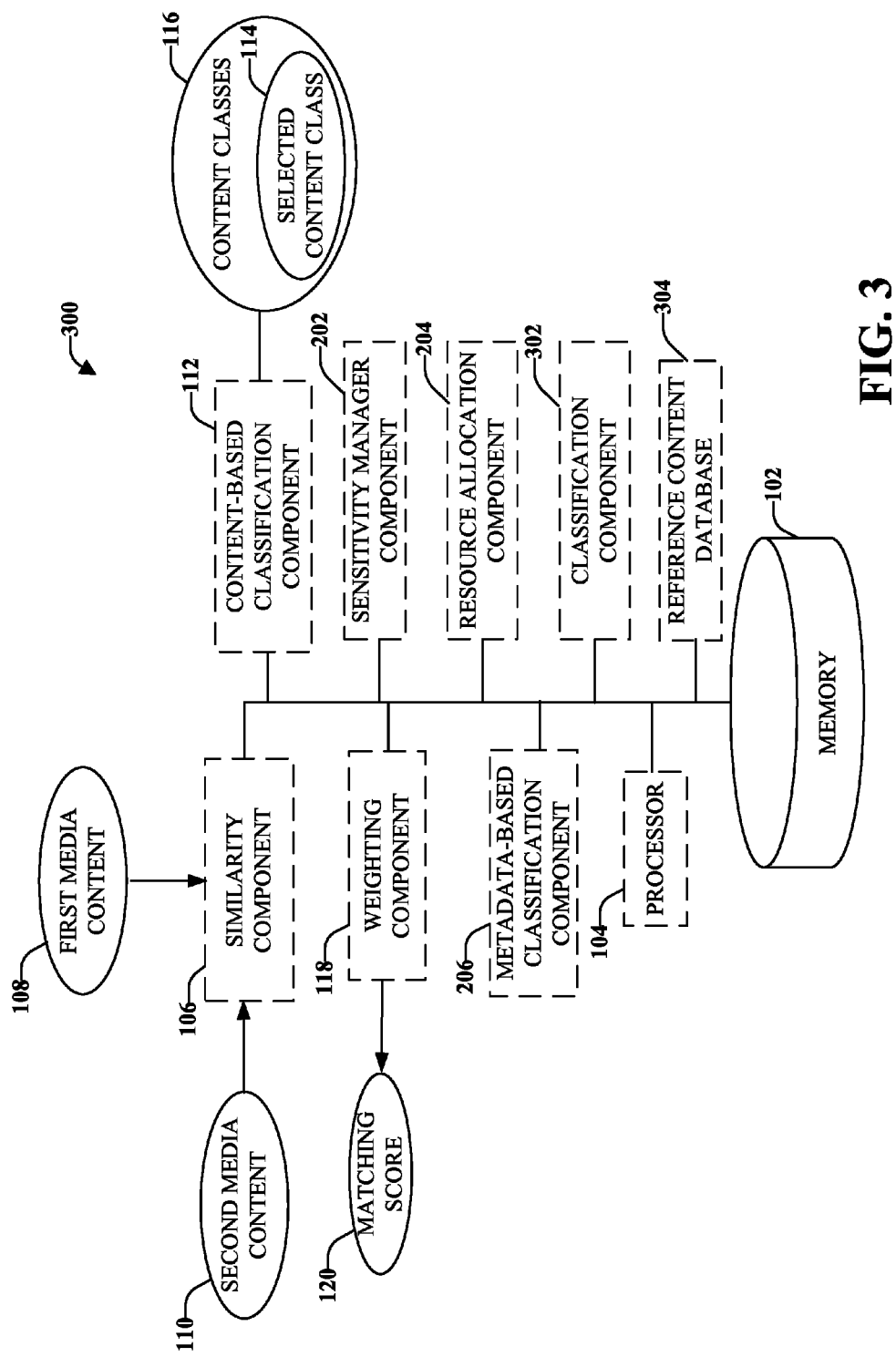
FIG. 3 illustrates an example, non-limiting system that employs classifiers for audio and video matching, according to an aspect.

FIG. 3 illustrates an example, non-limiting system 300 that employs classifiers for audio and video matching, according to an aspect. A classification component 302 can be employed to train classifiers prior to the matching process and/or at substantially the same time as the matching process is initiated. For example, the classification component can train classifiers on various copyrighted media content. Then, at classification time, the first media content and the second media content can be classified by running the trained classifiers (e.g., using classification component 302).

The classification component 302 can infer classification of media content by obtaining knowledge about the different types of content and/or knowledge about what is included in the different types of content. The knowledge (or information) can be obtained from direct input (from a user) that identifies the type of content and/or identifies what is included in the content, according to an implementation. In accordance with additional or alternative implementations, the knowledge can be obtained from an inference derived from historical analysis of the types of content and what is usually included in each type of content. In still other implementations, the knowledge can be obtained from other direct information and/or other inferred information, which can be both information received from an external source or information generated internally by the classification component 302 and/or another component of system 300.

Based, at least in part, on the knowledge obtained, the classification component 302 can make an inference based on which actions to implement and/or which classifiers to employ. For example, a process for deriving side-channel information and/or performing classification of audio features and/or video features can be enabled through an automatic classifier system and process.

A classifier is a function that maps an input attribute vector, $x=(x1, x2, x3, x4, xn)$, to a confidence that the input belongs to a class, that is, $f(x)$=confidence (class). Such classification can employ a probabilistic and/or statistical-based analysis (e.g., factoring into the analysis utilities and costs) to prognose or infer an action that a user desires to be automatically performed and/or that can be automatically performed.

In an implementation, the classification component 302 can derive side-channel information based on implementation of classifiers trained on computed audio features and/or video features of media content contained in a reference content database 304. In an example, the audio features can be low-level audio features, which can include, but are not limited to, mel-frequency cepstral coefficients (MFCC), spectral features, and so on. In another example, the video features can be low-level video features, which can include, but are not limited to, local areas of interest, such as repetitive motion, periodic motion, gestures, color, lighting, and so on.

According to another implementation, classification component 302 can derive side-channel information based on implementation of classifiers trained on computed video metadata and/or computed audio metadata of the media content within the reference content database 304. In another implementation, the classification component 302 can train classifiers based on a set of audio features and/or a set of video features included in the media content of the reference content database 304. Further to this implementation, the classification component 302 can perform classification on the set of audio features and/or the set of video features.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject disclosure, the one or more aspects can employ classifiers that are explicitly trained (e.g., through a generic training data). Alternatively or additionally, the classifiers can be implicitly trained (e.g., by observing a set of audio features and/or a set of video features, by observing low-level audio features and/or low-level video features, by observing video metadata and/or audio metadata, and so on). For example, SVM's can be configured through a learning or training phase within a classifier constructor and feature selection module. Thus, the classifier(s) can be used to automatically learn and perform a number of functions as described herein. According to some aspects, the classification component 302 can use derived classifier scores and modify match scores at the end of matching, for example.

Figure 4:
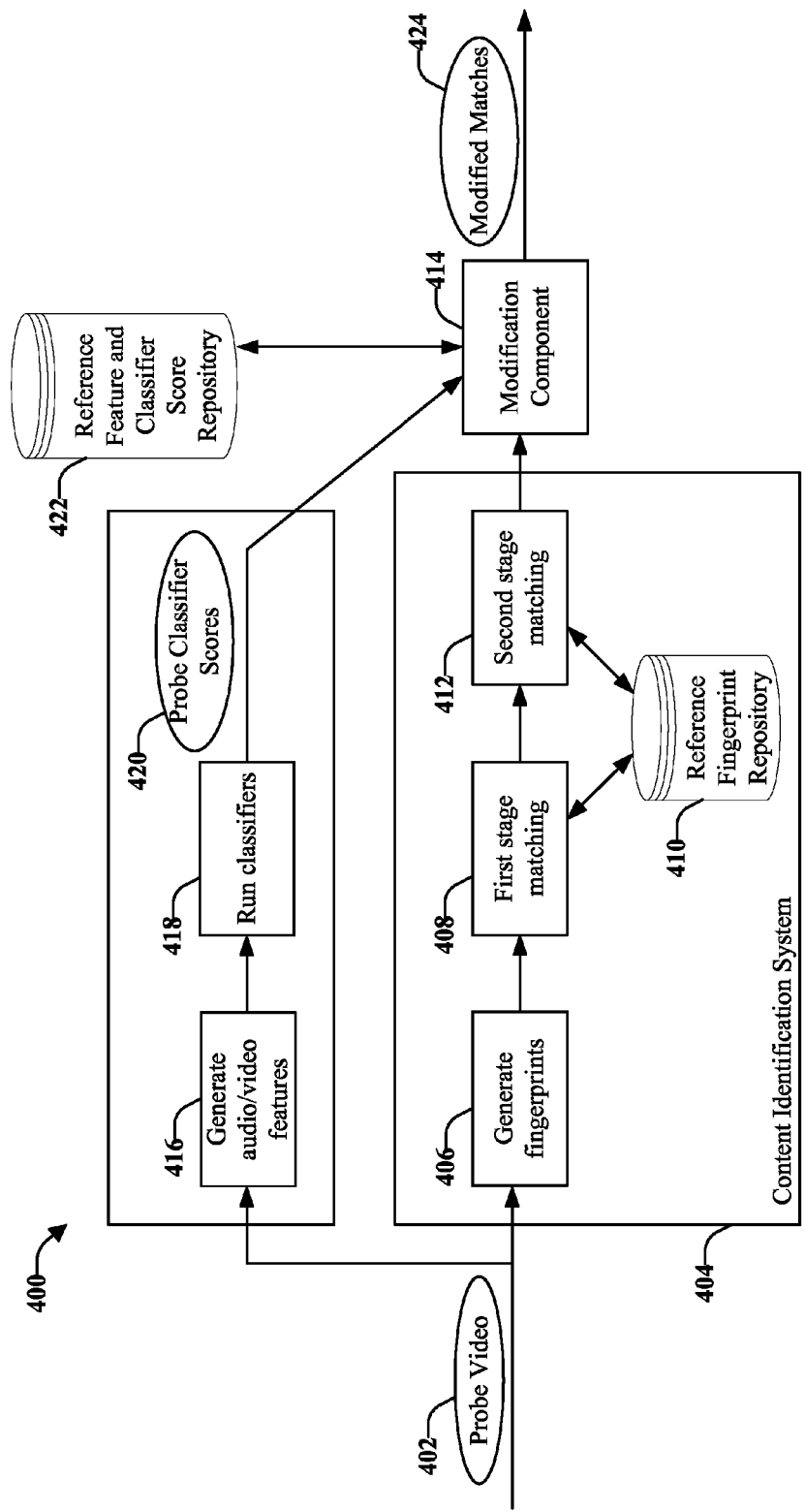
FIG. 4 illustrates another example, non-limiting system for audio and video matching, according to an aspect.

FIG. 4 illustrates another example, non-limiting system 400 for audio and video matching, according to an aspect. At least one probe video 402 is input into a content identification system 404. The content identification system 404 can generate fingerprints 406 (e.g., audio fingerprints and video fingerprints) associated with the probe video 402. The audio and video fingerprints generated are input to a first stage matching component 408, which focuses on recall. The matching developed by the first stage matching component 408 can be based, at least in part, on accessing a reference fingerprint repository 410 matching component. The reference fingerprint repository 410 can be accessed in order to look up potentially matching fingerprints. The first stage matching component 408 can generate a set of candidate references, which are provided to a second stage matching component 412. The second stage matching component 412 can access the reference fingerprint repository 410 to search for potentially matching fingerprints, with a focus on precision. The second stage matching component 412 outputs matches to a modification component 414.

According to an aspect, the probe video 402 can also be provided to a component 416 for the generation of audio and/or video features. Another component 418 can run classifiers on the generated audio and/or video features and output probe classifier scores 420. The probe classifier scores 420 can be output to the modification component 414.

The modification component 414 can access a reference feature and classifier score repository 422 to search for classifier scores for candidate references. The modification component 414 can use the classifier scores to modify the match strengths and outputs the modified matches 424.

In the implementation of FIG. 4, provided are derived classifier scores for references to modify match scores at the end of matching. An alternative approach is to incorporate the classifier scores at an earlier stage, for example, to prune the list of candidates moving between stages. Another alternative approach is to adjust the parameters of the fingerprint matching in any of the stages.

Illustrated in FIG. 4 is the optional computation of features and derived classifier scores from the probe video material. This computation of features and derived classifier scores can provide an extra signal for use in the system 400, according to an aspect.

Figure 5:
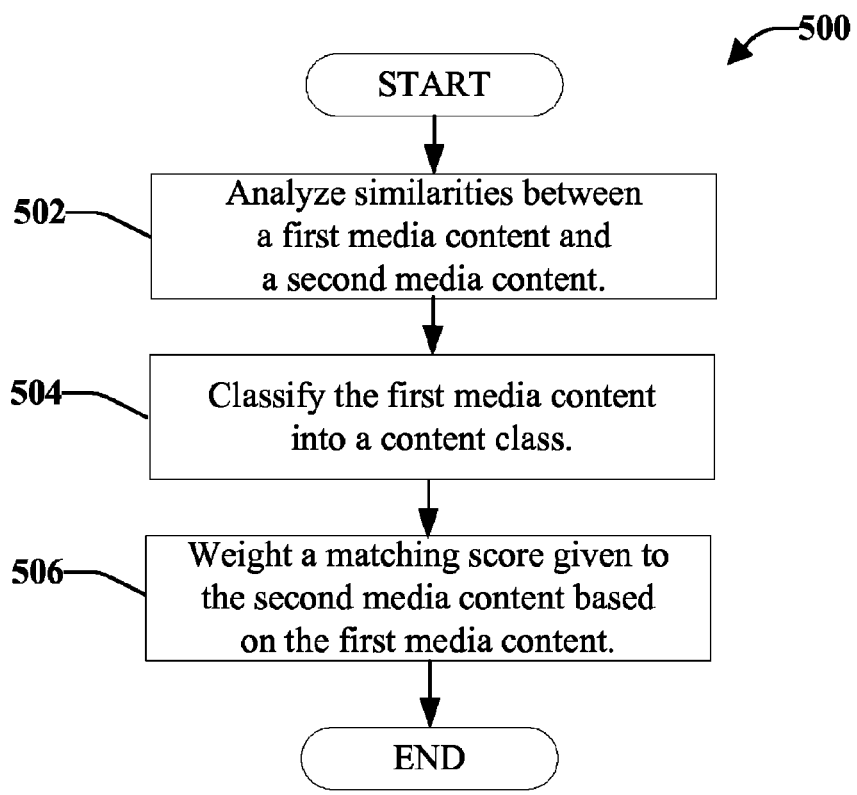
FIG. 5 illustrates an example, non-limiting method for audio and video matching, according to an aspect.

FIG. 5 illustrates an example, non-limiting method 500 for audio and video matching, according to an aspect. While, for purposes of simplicity of explanation, the methods are shown and described as a series of acts, the disclosed subject matter is not limited by the order of acts, as some acts may occur in different orders and/or concurrently with other acts from that shown and described herein. For example, those skilled in the art will understand and appreciate that a method can alternatively be represented as a series of interrelated states or events, such as in a state diagram. Moreover, not all illustrated acts may be required to implement a method in accordance with the disclosed subject matter. Additionally, it is to be appreciated that the methods disclosed in this detailed description are capable of being stored on an article of manufacture to facilitate transporting and transferring such methodologies to computers or other computing devices. The various methods disclosed herein can use a processor to execute computer executable components stored in a memory.

Method 500 starts, at 502, when similarities between a first media content and a second media content are analyzed (e.g., using a similarity component 106) to obtain at least one matched region. For example, the matched region(s) can be one or more portions of the second media content that match the first media content. In another example, the entirety of the second media content might match the first media content.

At 504, at least the first media content is classified into a content class (e.g., using a content-based classification component 112). The content class for the first media content can be selected from a plurality of content classes, which can be retained in a database or memory.

A matching score given to the second media content is weighted, at 506, based on statistics regarding matches and false-positive rates for the content type(s) of the first media content (e.g., using a weighting component 118). In an implementation, the matching score given to the at least one matched region can be weighted based on knowledge of statistics of the matches and false-positive rate(s) for specific genres of video included in the first media content and the second media content.

Figure 6:
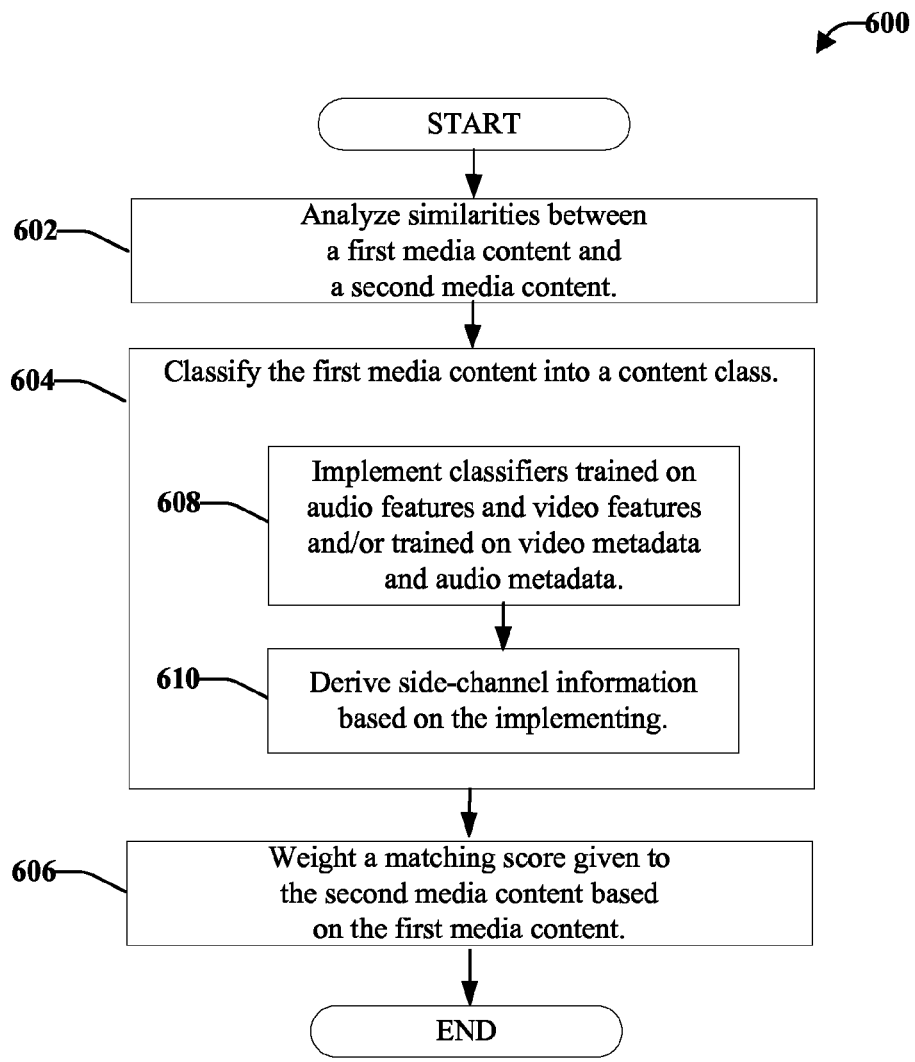
FIG. 6 illustrates an example, non-limiting method for adding side-channel information to facilitate audio and video matching, according to an aspect.

FIG. 6 illustrates an example, non-limiting method 600 for adding side-channel information to facilitate audio and video matching, according to an aspect. Similarities between a first media content and at least a second media content are analyzed, at 602, to obtain one or more matched regions (e.g., using a similarity component 106). In an example, two matching stages can be utilized where a first matching stage focuses on recall and a second matching stage focuses on precision of the match.

At 604, the first media content is classified into a content class selected from a plurality of content classes (e.g., using a content-based classification component 112). Further, at 606, a matching score given to the second media content is weighted (e.g., using a weighting component 118) based on statistics regarding matches and false-positive rates for the content class of the first media content.

According to an implementation, the classification at 604, can include implementing trained classifiers, at 608 (e.g., using the content-based classification component 112). According to an implementation, the classifiers can be trained on audio features and/or video features. In some implementations, the classifiers can be trained on low-level audio features and/or low level video features. In additional or alternative implementations, the classifiers can be trained on video metadata and/or audio metadata.

In some implementations, a sensitivity of the classification can be increased or decreased. For example, the sensitivity of the classification can be increased and/or decreased based upon how easily different portions of the media content can be distinguished from other portions of the media content. In another example, the distribution of how resources are used can be managed and dynamically changed. For example, the resource management can include adjusting where, and when, various resources are consumed.

At 610, side-channel information can be derived based on the implementation of the trained classifiers (e.g., using a classification component 302). For example, the side-channel information can be derived from classifiers trained on computed audio features, video features, low-level audio features, and/or low-level video features of the first media content and the second media content.

According to another example, the side-channel information can be derived based on implementation of classifiers trained on computed video metadata and audio metadata of the first media content and the second media content. The side-channel information refers to the content classes derived from classifying the first media content as well as other reference media content (e.g., copyrighted media content). The classifiers can be trained in order to classify the first media content and the second media content into a plurality of content classes.

Figure 7:
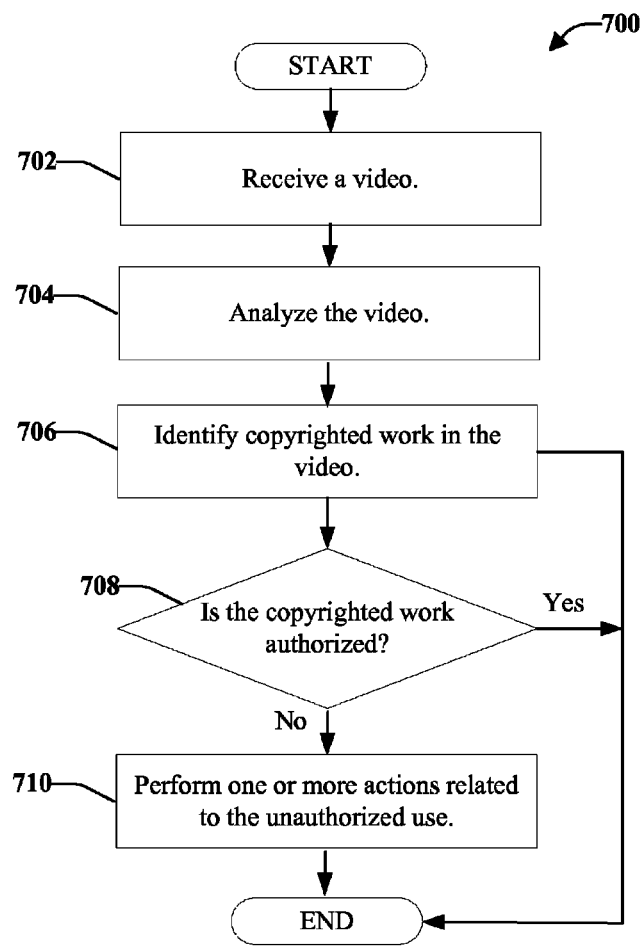
FIG. 7 illustrates an example, non-limiting embodiment of a method for implementation of audio and video matching using a hybrid of fingerprinting and content based classification, according to an aspect.

FIG. 7 illustrates an example, non-limiting embodiment of a method 700 for implementation of audio and video matching using a hybrid of fingerprinting and content based classification, according to an aspect. Method 700 starts at 702 when a video is received. For example, a user can upload a video to a media sharing website and the video can be received at substantially the same time as the video is uploaded. In another example, the video can be received at about the same time as the video is identified as potentially containing copyrighted content (e.g., flagged by another user). In further examples, the video can be received based on a random review of videos, which might be based on an amount of times the video has been viewed and/or videos that have been viewed before or after the video.

At 704, the video is analyzed as discussed herein. For example, the video can be categorized into a genre of videos. For example, audio and/or video features of the video can be categorized as being associated with a specific genre (e.g., based on a matching quality or vertical). Various matching regions of the video can be compared with one or more reference videos or reference copyright content, which has already been categorized into the particular genre.

Copyrighted content contained in the video is identified, at 706. If there is no copyrighted content contained in the video, method 700 ends. Specific matching regions of the video can be given a score based on prior knowledge about the statistics of the genre. In some situations, the score can be up weighted or down weighted based on false-positive rates and/or confidence levels associated with the genre.

A determination is made, at 708, whether the video contains authorized copyrighted content. For example, the video might contain copyrighted content, but that content might have been previously authorized for use in the video. For example, permission might have been granted to use the copyrighted content at about the same time as the video was made, at about the same time as the video was uploaded, or at a different time. In an example, the video might have previously undergone analysis and through negotiation, the content contained within that video might have been converted from unauthorized content to authorized content.

If the copyrighted content within the video is authorized, method 700 ends. However, if the copyrighted content within the video is not authorized, method 700 continues at 710 and further actions are taken related to the video. According to an implementation, the action can include blocking distribution and/or viewing of the video. For example, a notice can be sent to an operator of the media sharing website to remove or block access to the video.

According to another implementation, the action can include notifying the author of the video of the existence of the copyrighted work and that the use is unauthorized. Such notification can include allowing the author to modify the video to remove the copyrighted work or the opportunity to negotiate a license to use the copyrighted work. In another implementation, the action can include notifying the owner of the copyrighted work of the existence of the unauthorized media content. The owner of the copyrighted work can determine whether or not the use of the copyrighted work was authorized. This can allow the owner to authorize the use in exchange for some type of reward and/or benefit. In such a manner, the owner can protect their work while authorizing use of the work by others.

Figure 8:
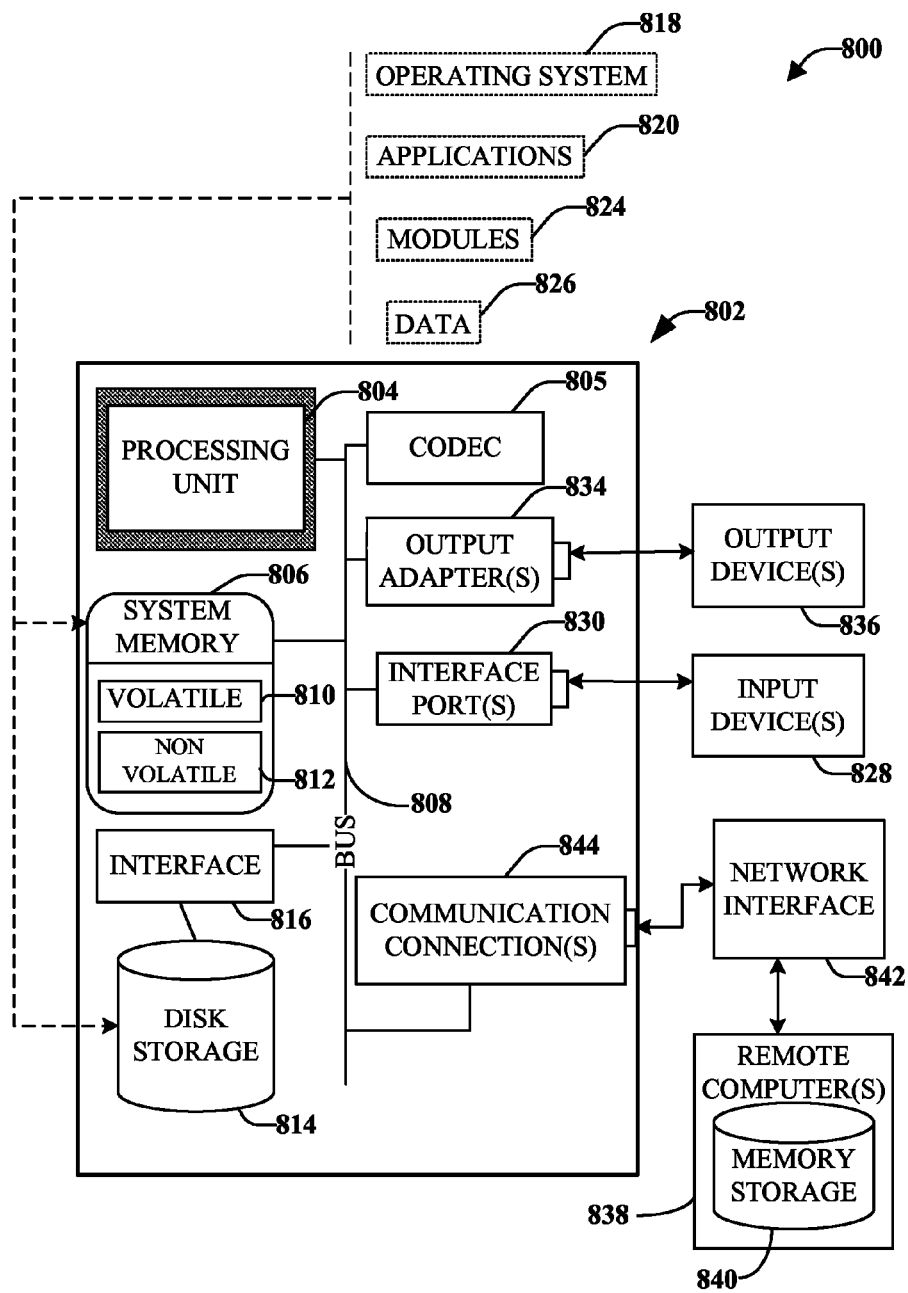
FIG. 8 illustrates a block diagram representing an exemplary non-limiting networked environment in which various embodiments can be implemented.

With reference to FIG. 8, a suitable environment 800 for implementing various embodiments of the disclosed subject matter includes a computer 802. The computer 802 can be used in connection with implementing one or more of the systems, components, modules, or methods shown and described in connection with the above figures. The computer 802 includes a processing unit 804, a system memory 806, a codec 805, and a system bus 808. The system bus 808 couples system components including, but not limited to, the system memory 806 to the processing unit 804. The processing unit 804 can be any of various available processors. Dual microprocessors and other multiprocessor architectures also can be employed as the processing unit 804.

The system bus 808 can be any of several types of bus structure(s) including a memory bus or memory controller, a peripheral bus or external bus, and/or a local bus using any variety of available bus architectures including, but not limited to, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 806 includes volatile memory 810 and non-volatile memory 812. The basic input/output system (BIOS), containing the basic routines to transfer information between elements within the computer 802, such as during start-up, is stored in non-volatile memory 812. In addition, according to an embodiment, codec 805 may include at least one of an encoder or decoder, wherein the at least one of an encoder or decoder may consist of hardware, a combination of hardware and software, or software. Although, codec 805 is depicted as a separate component, codec 805 may be contained within non-volatile memory 812. By way of illustration, and not limitation, non-volatile memory 812 can include read only memory (ROM), programmable ROM (PROM), electrically programmable ROM (EPROM), electrically erasable programmable ROM (EEPROM), or flash memory.

Volatile memory 810 includes random access memory (RAM), which acts as external cache memory. According to various embodiments, the volatile memory may store write operation retry logic (not shown in FIG. 8) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM).

Computer 802 may also include removable/non-removable, volatile/non-volatile computer storage medium. FIG. 8 illustrates, for example, disk storage 814. Disk storage 814 includes, but is not limited to, devices such as a magnetic disk drive, solid state disk (SSD) floppy disk drive, tape drive, Jaz drive, Zip drive, LS-70 drive, flash memory card, or memory stick. In addition, disk storage 814 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 814 to the system bus 808, a removable or non-removable interface can be used, such as interface 816.

It is noted that FIG. 8 describes software that acts as an intermediary between users and the basic computer resources described in the suitable operating environment 800. Such software includes an operating system 818. Operating system 818, which can be stored on disk storage 814, acts to control and allocate resources of the computer 802. Applications 820 take advantage of the management of resources by operating system 818 through program modules 824 and program data 826, such as boot/shutdown transaction table and the like, stored either in system memory 806 or on disk storage 814. It is to be appreciated that the disclosed embodiments can be implemented with various operating systems or combinations of operating systems.

A user enters commands or information into the computer 802 through input device(s) 828 (e.g., a user interface). Input devices 828 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 804 through the system bus 808 via interface port(s) 830. Interface port(s) 830 includes, for example, a serial port, a parallel port, a game port, and a universal serial bus (USB). Output device(s) 836 use some of the same type of ports as input device(s) 828. Thus, for example, a USB port may be used to provide input to computer 802, and to output information from computer 802 to an output device 836. Output adapter 834 is provided to illustrate that there are some output devices 836 such as monitors, speakers, and printers, among other output devices 836, which require special adapters. The output adapters 834 include, by way of illustration and not limitation, video and sound cards that provide a means of connection between the output device 836 and the system bus 808. It should be noted that other devices and/or systems of devices provide both input and output capabilities such as remote computer(s) 838.

Computer 802 can operate in a networked environment using logical connections to one or more remote computers, such as remote computer(s) 838 (e.g., a family of devices). The remote computer(s) 838 can be a personal computer, a server, a router, a network PC, a workstation, a microprocessor based appliance, a peer device, a smart phone, a tablet, or other network node, and can include many of the elements described relative to computer 802. For purposes of brevity, only a memory storage device 840 is illustrated with remote computer(s) 838. Remote computer(s) 838 is logically connected to computer 802 through a network interface 842 and then connected via communication connection(s) 844. Network interface 842 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks such as Integrated Services Digital Networks (ISDN) and variations thereon, packet switching networks, and Digital Subscriber Lines (DSL).

Communication connection(s) 844 refers to the hardware/software employed to connect the network interface 842 to the system bus 808. While communication connection 844 is shown for illustrative clarity inside computer 802, it can also be external to computer 802. The hardware/software necessary for connection to the network interface 842 includes, for exemplary purposes only, internal and external technologies such as, modems including regular telephone grade modems, cable modems and DSL modems, ISDN adapters, and wired and wireless Ethernet cards, hubs, and routers.

Figure 9:
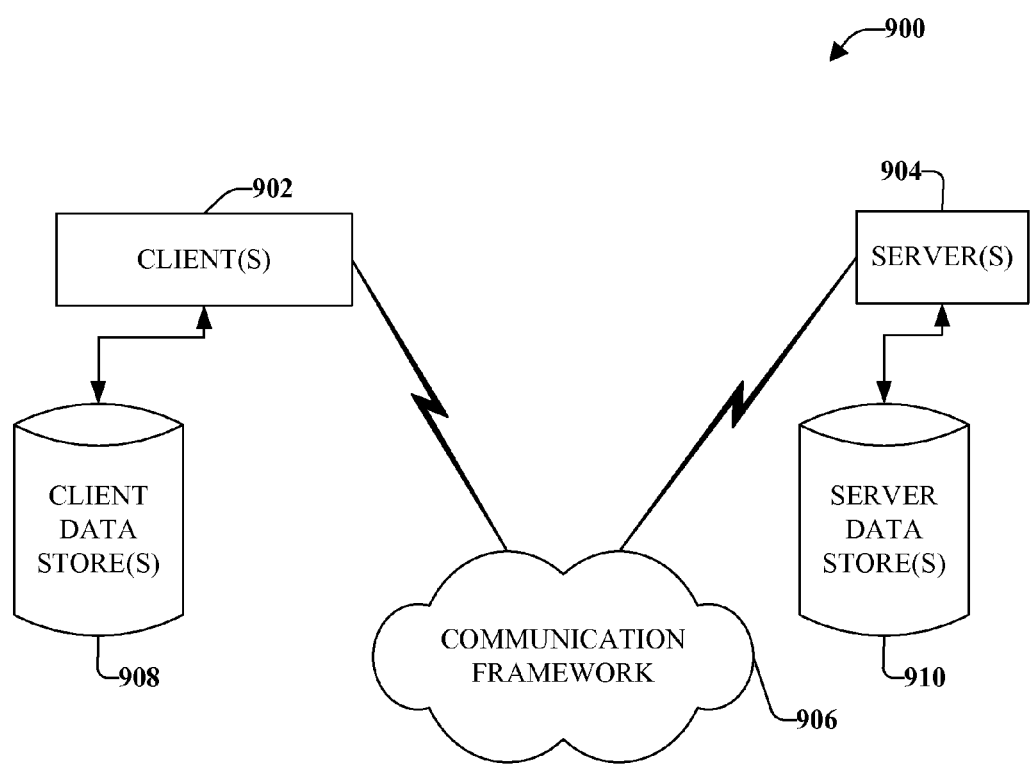
FIG. 9 illustrates a block diagram representing an exemplary non-limiting computing system or operating environment in which various embodiments may be implemented.

Referring now to FIG. 9, there is illustrated a schematic block diagram of a computing environment 900 in accordance with the disclosed embodiments. The computing environment 900 includes one or more client(s) 902 (e.g., laptops, smart phones, PDAs, media players, computers, portable electronic devices, tablets, and the like). The client(s) 902 can be hardware and/or software (e.g., threads, processes, computing devices). The computing environment 900 also includes one or more server(s) 904. The server(s) 904 can also be hardware or hardware in combination with software (e.g., threads, processes, computing devices). The servers 904 can house threads to perform transformations by employing aspects of this disclosure, for example.

One possible communication between a client 902 and a server 904 can be in the form of a data packet transmitted between two or more computer processes wherein the data packet may include video data. The data packet can include metadata, such as associated contextual information, for example. The computing environment 900 includes a communication framework 906 (e.g., a global communication network such as the Internet, or mobile network(s)) that can be employed to facilitate communications between the client(s) 902 and the server(s) 904.

Communications can be facilitated via a wired (including optical fiber) and/or wireless technology. The client(s) 902 include, or are operatively connected to, one or more client data store(s) 908 that can be employed to store information local to the client(s) 902 (e.g., associated contextual information). Similarly, the server(s) 904 operatively include, or are operatively connected to, one or more server data store(s) 910 that can be employed to store information local to the servers 904.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the embodiments of the subject disclosure. Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of various embodiments. It is, of course, not possible to describe every conceivable combination of components or methodologies for purposes of describing the one or more aspects, but it is to be appreciated that many further combinations and permutations of the various aspects are possible. Accordingly, the subject disclosure is intended to embrace all such alterations, modifications, and variations. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosed illustrated exemplary aspects of the disclosed subject matter. In this regard, it will also be recognized that the aspects include a system as well as a computer-readable storage medium (e.g., a tangible computer-readable storage medium) having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art. Although the components described herein are primarily described in connection with performing respective acts or functionalities, it is to be understood that in a non-active state these components can be configured to perform such acts or functionalities.

As used in this application, the terms "component", "module", "system", or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific functions; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Reference throughout this specification to "one implementation," or "an implementation," or "one embodiment," or "an embodiment" means that a particular feature, structure, or characteristic described in connection with the implementation or embodiment is included in at least one implementation or one embodiment. Thus, the appearances of the phrase "in one implementation," or "in an implementation," or "in one embodiment," or "in an embodiment" in various places throughout this specification can, but are not necessarily, referring to the same implementation or embodiment, depending on the circumstances. Furthermore, the particular features, structures, or characteristics may be combined in any suitable manner in one or more implementations or embodiments.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, for example, via access requests, queries, or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, for example, a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In addition, while a particular feature of the disclosed aspects may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system, comprising:
a memory having stored thereon computer executable instructions; and
at least one processor that executes the instructions stored in the memory which cause the at least one processor to:
receive a first media content item that comprises first audio content having first low-level audio features and first video content having first low-level video features;
determine that the first media content item belongs to a first genre of a plurality of genres based on first side channel information, wherein the first side channel information is based at least on the first low-level audio features and the first low-level video features;
receive a second media content item that comprises second audio content having second low-level audio features and second low-level video features;
determine that the second media content item belongs to the first genre of the plurality of genres based on second side channel information, wherein the second side channel information is based at least on the second low-level audio features and the second low-level video features;
generate a first fingerprint based on the first audio content;
in response to determining that the first media content item belongs to the first genre, select, based on the first genre, a plurality of audio fingerprints that are associated with the first genre, wherein the selected plurality of audio fingerprints includes a second fingerprint that is based on the second audio content;
determine a matching score between the first media content item and the second media content item by comparing the first audio fingerprint of the first audio content and the second audio fingerprint of the second audio content;
determine a rate of false-positive matches between media content items that belong to the first genre;
apply a weight to the matching score based on the rate of false-positive matches;
determine, based on the weighted matching score, that the first audio content matches the second audio content;
determine that the second audio content contains copyrighted content, wherein the copyrighted content is associated with a copyright owner; and
notify the copyright owner that the first media content item matches the second media content item.

2. The system of claim 1, wherein determining that the first media content item belongs to a first genre of a plurality of genres is further based on implementation of classifiers trained on computed audio features and video features of at least the second media content item.

3. The system of claim 1, wherein determining that the first media content item belongs to a first genre of a plurality of genres is further based on implementation of classifiers trained on computed video metadata and audio metadata of at least the first media content item.

4. The system of claim 1, wherein applying the weight to the matching score comprises down weighting the matching score based on the rate of false-positive matches associated with the first genre.

5. The system of claim 4, wherein the first media content item comprises classical music.

6. The system of claim 1, wherein applying the weight to the matching score comprises up weighting the matching score based on an accuracy associated with the first genre.

7. The system of claim 1, wherein the comparison of the first audio fingerprint with the second audio fingerprint is increased in sensitivity based on the determination that the first media content item belongs to the first genre.

8. The system of claim 7, wherein the first genre is associated with techno music.

9. The system of claim 1, wherein the first media content item comprises a plurality of segments that includes a segment of interest and the determining of the matching score is configured to expend more resources on the segment of interest than an amount of resources expended on other segments of the plurality of segments.

10. The system of claim 1, wherein the matching score is further weighted based on derived classifier scores associated with the first genre.

11. A method, comprising:
receiving, at a device comprising a processor, a first media content item that comprises first low-level audio features and first video content having first low-level video features;
determining that the first media content item belongs to a first genre of a plurality of genres based on first side channel information, wherein the first side channel information is based at least on the first low-level audio features and the first low-level video features;
receiving a second media content item that comprises second audio content having second low-level audio features and second low-level video features;
determining that the second media content item belongs to the first genre of the plurality of genres based on second side channel information, wherein the second side channel information is based at least on the second low-level audio features and the second low-level video features;
generating a first fingerprint based on the first audio content;
in response to determining that the first media content item belongs to the first genre, selecting, based on the first genre, a plurality of audio fingerprints that are associated with the first genre, wherein the selected plurality of audio fingerprints includes a second fingerprint that is based on the second audio content;
determining a matching score between the first media content item and the second media content item by comparing the first audio fingerprint of the first audio content and the second audio fingerprint of the second audio content;
determining a rate of false-positive matches between media content items that belong to the first genre;
applying a weight to the matching score based on the rate of false-positive;

determining, based on the weighted matching score, that the first audio content matches the second audio content;

determining that the second audio content contains copyrighted content, wherein the copyrighted content is associated with a copyright owner; and notifying the copyright owner that the first media content item matches the second media content item.

12. The method of claim 11, further comprising:

ascertaining that the copyrighted content of the second media content item is not authorized; and blocking publication of the first media content item based on the ascertaining.

13. The method of claim 11, further comprising:

ascertaining the first media content comprises an unauthorized copyrighted portion that matches the second media content.

14. The method of claim 11, wherein the determining that the first media content item belongs to a first genre further comprises:

implementing classifiers trained on at least one of:
  a first defined level of audio and a second defined level of video features of a plurality of media content items; or
  video metadata and audio metadata of the plurality of media content items.

15. A non-transitory computer-readable storage medium comprising computer-readable instructions that, in response to execution, cause a processor to perform operations, comprising:

receiving a first media content item that comprises first low-level audio features and first video content having first low-level video features;

determining that the first media content item belongs to a first genre of a plurality of genres based on first side channel information, wherein the first side channel information is based at least on the first low-level audio features and the first low-level video features;

receiving a second media content item that comprises second audio content having second low-level audio features and second low-level video features;

determining that the second media content item belongs to the first genre of the plurality of genres based on second side channel information, wherein the second side channel information is based at least on the second low-level audio features and the second low-level video features;

generating a first fingerprint based on the first audio content;

in response to determining that the first media content item belongs to the first genre, selecting, based on the first genre, a plurality of audio fingerprints that are associated with the first genre, wherein the selected plurality of audio fingerprints includes a second fingerprint that is based on the second audio content;

determining a matching score between the first media content item and the second media content item by comparing the first audio fingerprint of the first audio content and the second audio fingerprint of the second audio content;

determining a rate of false-positive matches between media content items that belong to the first genre;

applying a weight to the matching score based on the rate of false-positive matches;

determining, based on the weighted matching score, that the first audio content matches the second audio content;

determining that the second audio content contains copyrighted content, wherein the copyrighted content is associated with a copyright owner; and notifying the copyright owner that the first media content item matches the second media content item.

16. The non-transitory computer-readable storage medium of claim 15, the operations further comprising:

training classifiers based on a set of audio features derived from a plurality of media content items; and performing classification on the first low-level audio features of the first media content item and the second low-level audio features of the second media content item as a result of the trained classifiers.

17. The non-transitory computer-readable storage medium of claim 15, wherein the determined first genre is techno music, the operations further comprising:

increasing a sensitivity of the comparison between the first audio fingerprint and the second audio fingerprint based on the determination that the first media content item belongs to the first genre.

18. The non-transitory computer-readable storage medium of claim 15, wherein the first media content comprises a plurality of segments that includes a segment of interest, the operations further comprising:

expending more resources at the matching on the segment of interest compared to matching other segments of the plurality of segments.

19. The non-transitory computer-readable storage medium of claim 15, wherein the determined first genre is classical music, the operations further comprising:

down weighting the matching score based on false-positive rates associated with the classical music genre.

* * * * *